United States Patent
Jung et al.

(10) Patent No.: US 12,146,839 B1
(45) Date of Patent: Nov. 19, 2024

(54) DEEP LEARNING SYSTEM APPLICABLE FOR QUALITY INSPECTION BY LEARNING ONLY NON-DEFECTIVE MANUFACTURED PRODUCT DATA AND CONTROL METHOD THEREOF

(71) Applicant: INTER X Co., Ltd., Ulsan (KR)

(72) Inventors: Ha Il Jung, Ulsan (KR); Jung Ywn Park, Ulsan (KR); Qing Tang, Ulsan (KR); Jeong Hyun Park, Ulsan (KR)

(73) Assignee: INTER X Co., Ltd., Ulsan (KR)

( * ) Notice: Subject to any disclaimer, the term of this patent is extended or adjusted under 35 U.S.C. 154(b) by 0 days.

(21) Appl. No.: 18/787,162

(22) Filed: Jul. 29, 2024

(51) Int. Cl.
| | |
|---|---|
| *G01N 21/88* | (2006.01) |
| *G06T 3/40* | (2006.01) |
| *G06T 7/00* | (2017.01) |
| *G06V 10/44* | (2022.01) |

(52) U.S. Cl.
CPC .......... *G01N 21/8851* (2013.01); *G06T 3/40* (2013.01); *G06T 7/0008* (2013.01); *G06V 10/44* (2022.01)

(58) Field of Classification Search
CPC ..... G01N 21/8851; G06T 3/40; G06T 7/0008; G06V 10/44
See application file for complete search history.

(56) References Cited

U.S. PATENT DOCUMENTS

| | | | |
|---|---|---|---|
| 11,521,120 B2* | 12/2022 | Watanabe | ............... G06N 5/04 |
| 12,038,603 B2* | 7/2024 | Ozaki | .................. G02B 6/122 |
| 2022/0134435 A1 | 5/2022 | Scime et al. | |

FOREIGN PATENT DOCUMENTS

| | | |
|---|---|---|
| KR | 10-2021-0072282 A | 6/2021 |
| KR | 10-2343272 B1 | 12/2021 |

OTHER PUBLICATIONS

Z. Liu et al., "SimpleNet: A Simple Network for Image Anomaly Detection and Localization", arXiv:2303.15140v2, Mar. 28, 2023.
F. Akhyar et al., "FDD: a deep learning-based steel defect detectors", The International Journal of Advanced Manufacturing Technology, Mar. 7, 2023.
P. Lee, "[Tensorflow] Class Imbalance (WCE, Focal Loss)", Jan. 8, 2020, [Oct. 21, 2023. search] <URL: https://m.blog.naver.com/siniphia/22176 4461342 >.
Ministry of Education, "Injection mold modification (LM1510010409_18v3)"., NCS learning module, Dec. 31, 2019.

* cited by examiner

*Primary Examiner* — Hung V Nguyen
(74) *Attorney, Agent, or Firm* — Bridgeway IP Law Group, PLLC; JIhun Kim (57) ABSTRACT

A deep learning-based quality inspection system by learning only non-defective manufactured product data may include: an input unit receiving a non-defective manufactured product image data set; a preprocessor preprocessing a model to learn the images with a same size by not applying a cropping task to cut and process only an area at a specific location within each image for each of the plurality of images included in the image data set, but applying a resizing task of adjusting each image to a desired size and a padding task of adjusting the size of the image while maintaining a ratio of each image as it is; and a controller extracting a non-defective manufactured product feature which becomes a non-defective manufactured product criterion from the preprocessed image, and generating a plurality of fake defective manufactured product features by adding a Gaussian noise feature to the extracted non-defective manufactured product feature.

4 Claims, 4 Drawing Sheets

DEEP LEARNING SYSTEM APPLICABLE FOR QUALITY INSPECTION BY LEARNING ONLY NON-DEFECTIVE MANUFACTURED PRODUCT DATA AND CONTROL METHOD THEREOF

CROSS-REFERENCE TO RELATED APPLICATIONS

This application claims the priority of Korean Patent Application No. 10-2023-0109144 filed on Aug. 21, 2024, in the Korean Intellectual Property Office, the disclosure of which is incorporated herein by reference.

BACKGROUND

Field

The present disclosure relates to a deep learning system applicable for quality inspection by learning only non-defective manufactured product data which is accurate and reliable in product quality inspection which is a core task in an injection process among various manufacturing fields, and a control method thereof.

Description of the Related Art

In general, the process environment is complex, and the collected images are not clear, so clear images are required for model learning, and image quality analysis and filtering must be done before the model learning.

At this time, an image classification artificial intelligence (AI) method requires a large amount of non-defective manufactured products and defective data for learning, but since the defect rate is low in the actual process, it is difficult to collect a large amount of defective data, so there are significantly fewer cases of surface inspection AI application in manufacturing.

In addition, according to the conventional method, AI accuracy was unstable due to incorrect application of classification criteria at the manufacturing site, making field application difficult.

Furthermore, according to the prior art, the size, length, color, etc. of each detected defect differed depending on the type, so there was a problem in that it was difficult to set a single criterion for all facilities and train the network.

Therefore, there is a growing need for systems and methods that can be easily used by anyone with AI that does not require prior learning of the various types of defects that appear on the product surface, and that can be quickly applied to a rapidly changing manufacturing environment because labeling is not required.

SUMMARY

In order to solve the problems in the prior art, an object to be achieved by the present disclosure is to provide a deep learning system applicable for quality inspection by learning only non-defective manufactured product data which is accurate and reliable in product quality inspection which is a core task in an injection process among various manufacturing fields, and a control method thereof.

An object to be achieved by the present disclosure is to provide a system of inspecting a defect by using only a non-defective manufactured product which can be easily collected, which is developed by the present disclosure, and a control method thereof because it is difficult to collect a large amount of defective data due to a low defective rate in the actual manufacturing process.

Further, yet another object to be achieved by the present disclosure is to provide a system of performing preprocessing by using the latest technique to enhance defective samples and a control method thereof, in order to avoid failing to detect defects located at edges by considering characteristics of actual manufacturing images.

Further, still yet another object to be achieved by the present disclosure is to provide a method for augmenting a fake defect feature by adding a Gaussian standard deviation to a non-defective sample as noise, and a system applying and modifying model architecture and a loss function to stabilize field application of deep learning-based quality inspection technology and a control method thereof.

Still yet another object to be achieved by the present disclosure is to provide, to a user, better performance than non-defective/defective manufactured product classification methodology which is an existing commonly used method through a method and a system considering characteristics of a factory environment and an actual product production process for all pipelines of product quality inspection by using only a non-defective manufactured product image unlike most injection process surface inspection AIs developed to date.

Further, the present disclosure includes quality analysis of images, learning of non-defective manufactured product images, design of measurement methods for injection process products, and the like, and the deep learning-based injection process product quality inspection technology can minimize a problem such as poor detection of a defect in an actual injection process environment, and is intended to be extensively applied even to other manufacturing fields.

Further, the present disclosure has been made in an effort to modify model architecture and a loss function to stabilize field application of deep learning-based quality inspection technology.

Further, the present disclosure has been made in an effort to use defect inspection as final judgment without adding AI technology or training to a defect measurement step due to difficulty in field application because a non-defective manufactured product criterion is different for each factory.

Further, since the deep learning-based quality inspection technology applicable for the injection process proposed by the present disclosure is artificial intelligence already learned by the non-defective manufactured product image, users need not separately construct learning data, and the deep learning-based quality inspection technology is intended to be quickly applied even in a manufacturing field such as small quantity production of multiple products.

Meanwhile, the technical objects of the present disclosure are not limited to the aforementioned technical objects, and other technical objects, which are not mentioned above, will be apparently appreciated by a person having ordinary skill in the art from the following description.

In order to achieve the technical object, according to an aspect of the present disclosure, there is provided a deep learning-based quality inspection method by learning only non-defective manufactured product data, which may include: step 1 of receiving, by an input unit, a non-defective manufactured product image data set; step 2 of preprocessing, by a preprocessor, a model to learn the images with a same size by not applying a cropping task to cut and process only an area at a specific location within each image for each of the plurality of images included in the image data set, but applying a resizing task of adjusting each image to a desired size and a padding task of adjusting the size of the image while maintaining a ratio of each image as it is; step 3 of extracting, by a controller, a non-defective manufactured product feature which becomes a non-defective manufactured product criterion from the preprocessed image; step 4 of generating, by the controller, a plurality of fake defective manufactured product features by adding a Gaussian noise feature to the extracted non-defective manufactured product feature; step 5 of performing, by a discriminator, learning based on at least some of the non-defective manufactured product image data set received from the controller, the extracted non-defective manufactured product feature, and the plurality of fake defective manufactured product features; step 6 of receiving, by the input unit, an actual image; step 7 of preprocessing, by the preprocessor, the actual image by applying at least one of the resizing and padding tasks for feature extraction; step 8 of extracting, by the controller, actual features from the preprocessed actual image; and step 9 of determining, by the discriminator, whether an object on the actual image is a non-defective manufactured product or a defective manufactured product through the extracted actual features based on the contents learned in step 5.

Further, in step 3 above, the controller may input the preprocessed image into a backbone network capable of extracting features at a plurality of scales from a plurality of data, and extract the features of the non-defective manufactured product by combining results of outputs of a plurality of pre-designated steps.

Further, in step 3 above, the controller may apply an average pooling operation to a second output result and a third output result of the backbone network and extract the non-defective manufactured product feature by combining the plurality of operated results.

In addition, in step 4 above, the controller may augment the plurality of fake defective manufactured product features by randomly selecting the Gaussian noise feature from the standard deviation, and adding the selected Gaussian noise feature to the extracted non-defective manufactured product features.

In addition, in step 5 above, the discriminator may be trained using hardness-aware soft cross entropy which is a loss function that adjusts a weight so that the model may concentratively learn samples of a small number which is equal to or less than a predetermined number.

Further, the plurality of fake defective manufactured product features may include short shot, flash, sink mark, silver streak, cloudy surface, weldline, void, crazing/cracking, and delamination.

Meanwhile, in order to achieve the technical object, according to another aspect of the present disclosure, there is provided a deep learning-based quality inspection system by learning only non-defective manufactured product data, which may include: an input unit receiving a non-defective manufactured product image data set; a preprocessor preprocessing a model to learn the images with a same size by not applying a cropping task to cut and process only an area at a specific location within each image for each of the plurality of images included in the image data set, but applying a resizing task of adjusting each image to a desired size and a padding task of adjusting the size of the image while maintaining a ratio of each image as it is; a controller extracting a non-defective manufactured product feature which becomes a non-defective manufactured product criterion from the preprocessed image, and generating a plurality of fake defective manufactured product features by adding a Gaussian noise feature to the extracted non-defective manufactured product feature; and a discriminator performing learning based on at least some of the non-defective manufactured product image data set received from the controller, the extracted non-defective manufactured product feature, and the plurality of fake defective manufactured product features, in which the input unit preprocesses an actual image by applying at least one of the resizing and padding tasks for feature extraction when receiving the actual image, the controller extracts actual features from the preprocessed actual image and the discriminator may judge whether an object on the actual image is a non-defective manufactured product or a defective manufactured product through the extracted actual features based on the contents learned in step 5 above.

Further, the controller may input the preprocessed image into a backbone network capable of extracting features of a plurality of scales on a plurality of data, and apply an average pooling operation to a second output result and a third output result of the backbone network, and extract the non-defective manufactured product feature by combining the plurality of operated results.

In addition, the controller may augment the plurality of fake defective manufactured product features by randomly selecting the Gaussian noise feature from the standard deviation, and adding the selected Gaussian noise feature to the extracted non-defective manufactured product features.

In addition, the discriminator may be trained using hardness-aware soft cross entropy which is a loss function that adjusts a weight so that the model may concentratively learn samples of a small number which is equal to or less than a predetermined number.

The "Hardness-aware Soft Cross Entropy" according to the present disclosure as one of the loss functions of the deep learning model is a method used primarily when performing the classification task in data sets having unbalanced class distribution. This method may be designed and used to improve overall performance by inducing the model to focus more on more difficult samples.

In order to solve the problems in the prior art, it is possible to provide a deep learning system applicable for quality inspection by learning only non-defective manufactured product data which is accurate and reliable in product quality inspection which is a core task in an injection process among various manufacturing fields, and a control method thereof.

It is possible to provide a system of inspecting a defect by using only a non-defective manufactured product which can be easily collected, which is developed by the present disclosure, and a control method thereof because it is difficult to collect a large amount of defective data due to a low defective rate in the actual manufacturing process.

Further, it is possible to provide a system of performing preprocessing by using the latest technique to enhance defective samples and a control method thereof, in order to avoid failing to detect defects located at edges by considering characteristics of actual manufacturing images.

Further, it is possible to provide a method for augmenting a fake defect feature by adding a Gaussian standard deviation to a non-defective sample as noise, and a system applying and modifying model architecture and a loss function to stabilize field application of deep learning-based quality inspection technology and a control method thereof.

The present disclosure can provide, to a user, better performance than non-defective/defective manufactured product classification methodology which is an existing commonly used method through a method and a system considering characteristics of a factory environment and an actual product production process for all pipelines of product quality inspection by using only a non-defective manufactured product image unlike most injection process surface inspection AIs developed to date.

Further, the present disclosure includes quality analysis of images, learning of non-defective manufactured product images, and design of measurement methods for injection process products, and the deep learning-based injection process product quality inspection technology can minimize a problem such as poor detection of a defect in an actual injection process environment, and can be extensively applied even to other manufacturing fields.

Further, the present disclosure can modify model architecture and a loss function to stabilize field application of deep learning-based quality inspection technology.

Further, the present disclosure can use defect inspection as final judgment without adding AI technology or training to a defect measurement step due to difficulty in field application because a non-defective manufactured product criterion is different for each factory.

Further, since the deep learning-based quality inspection technology applicable for the injection process proposed by the present disclosure is artificial intelligence already learned by the non-defective manufactured product image, users need not separately construct learning data, and the deep learning-based quality inspection technology can be quickly applied even in a manufacturing field such as small quantity production of multiple products.

Meanwhile, effects which can be obtained in the present disclosure are not limited to the aforementioned effects and other unmentioned effects will be clearly understood by those skilled in the art from the following description.

BRIEF DESCRIPTION OF THE DRAWINGS

The above and other aspects, features and other advantages of the present disclosure will be more clearly understood from the following detailed description taken in conjunction with the accompanying drawings, in which:

FIG. 5 illustrates an example of a defect type according to the present disclosure.

DETAILED DESCRIPTION OF THE PREFERRED EMBODIMENT

Hereinafter, a preferred exemplary embodiment of the present disclosure will be described with reference to drawings. In addition, the exemplary embodiment described below does not unduly limit the content of the present disclosure described in the claims, and it cannot be said that all of the configurations described in the exemplary embodiments are essential as a solution to the present disclosure. Deep Learning-Based Quality Inspection System FIG. 1 illustrates a block diagram of a deep learning-based quality inspection system applicable for an injection process proposed by the present disclosure.

Figure 1:
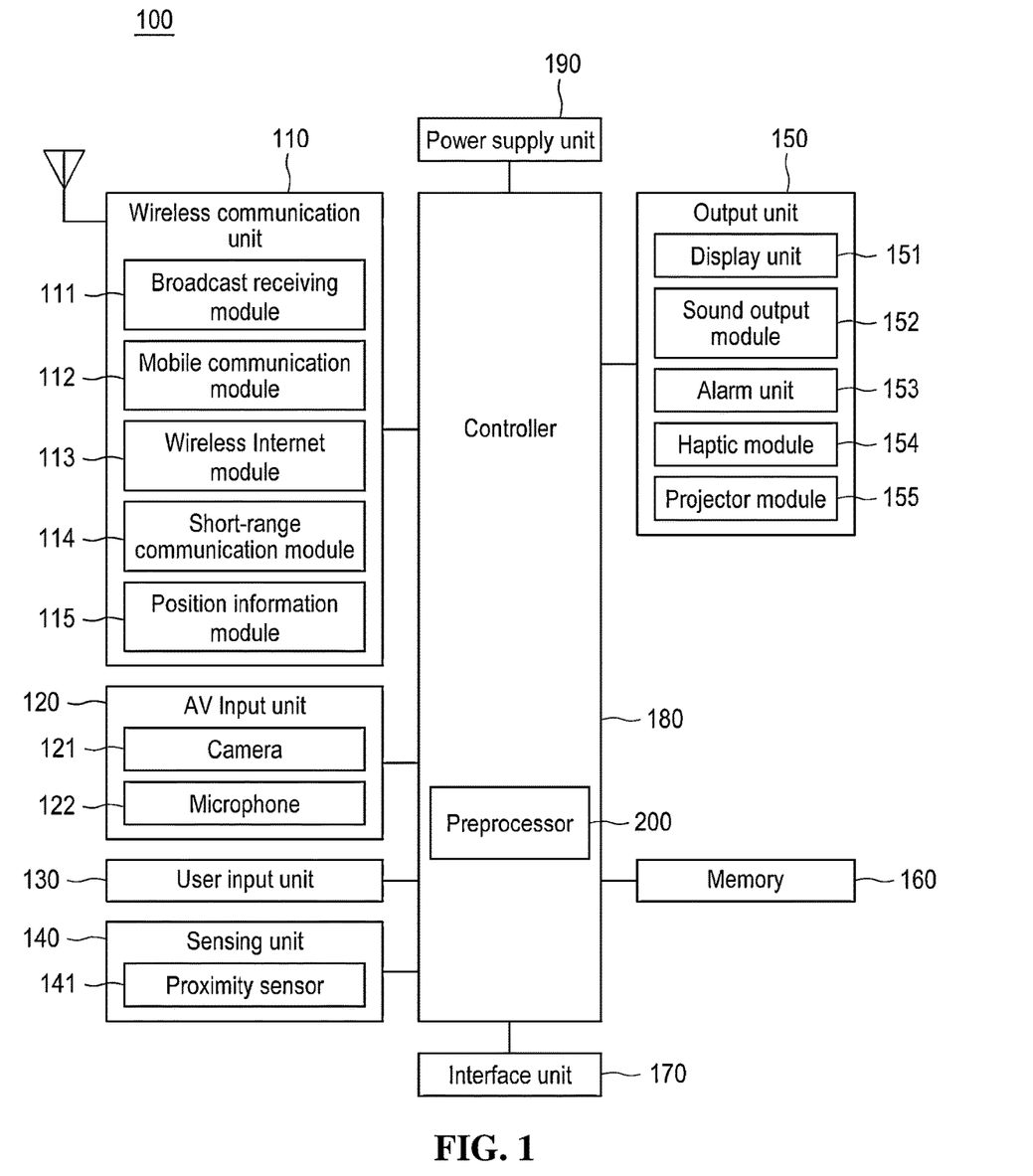
FIG. 1 illustrates a block diagram of a deep learning-based quality inspection system proposed by the present disclosure.

Referring to FIG. 1, the quality inspection system 100 according to the present disclosure may include a wireless communication unit 110, an audio/video (A/V) input unit 120, a user input unit 130, a sensing unit 140, an output unit 150, a memory 160, an interface unit 170, a controller 180, a power supply unit 190, and the like.

However, the components illustrated in FIG. 1 are not required. Therefore, a quality inspection system having more components therethan or fewer components therethan may be implemented.

Hereinafter, the components will be described in sequence.

The wireless communication unit 110 may include one or more modules which enable wireless communication between the quality inspection system and the wireless communication system or between the quality inspection system and the network at which the quality inspection system is positioned. For example, the wireless communication unit 110 may include a broadcast receiving module 111, a mobile communication module 112, a wireless Internet module 113, a short-range communication module 114, a position information module 115, and the like.

The broadcast receiving module 111 receives broadcast signals and/or broadcast-related information from an external broadcast management server through a broadcast channel.

The broadcast channel may include a satellite channel and a terrestrial channel. The broadcast management server may be a server for generating and transmitting the broadcast signals and/or broadcast-related information or a server for receiving previously generated broadcast signals and/or broadcast-related information and transmitting the received broadcast signals and/or broadcast-related information to the quality inspection system. The broadcast signals may include a TV broadcast signal, a radio broadcast signal, and a data broadcast signal and include even a broadcast signal of a type in which the data broadcast signal is combined with the TV broadcast signal or the radio broadcast signal.

The broadcast-related information may mean information related to the broadcast channel, a broadcast program, or a broadcast service provider. The broadcast-related information may be provided even through a mobile communication network. In this case, the broadcast-related information may be received by the mobile communication module 112.

The broadcast-related information may exist in various types. For example, the broadcast-related information may exist as a type such as electronic program guide (EPG) of digital multimedia broadcasting (DMB) or electronic service guide (ESG) of digital video broadcast-handheld (DVB-H).

The broadcast signal and/or broadcast-related information received through the broadcast receiving module 111 may be stored in the memory 160.

The mobile communication module 112 transmits/receives a radio signal to/from at least one of a base station, an external quality inspection system, and a server on a mobile communication network.

The wireless Internet module 113 may refer to a module for wireless Internet access and may be internally or externally built in the quality inspection system. As the wireless Internet technology, wireless LAN (WLAN) (Wi-Fi), wireless broadband (Wibro), world interoperability for microwave access (Wimax), high speed downlink packet access (HSDPA), or the like, may be used.

The short-range communication module 114 represents a module for short-range communication. As short-range communication technology, Bluetooth, radio frequency identification (RFID), infrared data association (IrDA), ultra wideband (UWB), ZigBee, or the like may be used.

The position information module 115 is a module for acquiring the position of the quality inspection system and a representative example thereof is a global position system (GPS) module.

Referring to FIG. 1, an audio/video (A/V) input unit 120 which is used for inputting an audio signal or a video signal may include a camera 121, a microphone 122, and the like.

The camera 121 processes an image frame such as a still image or a moving picture obtained by an image sensor in a photographing mode. The processed image frame may be displayed on the display unit 151.

The images frame processed by the camera 121 may be stored in the memory 160 or transmitted to the outside through the wireless communication unit 110.

A plurality of cameras 121 are used according to a usage environment.

The microphone 122 receives an external sound signal by a microphone in a recording mode, a voice recognition mode, or the like, and processes the received external sound signal as electrical voice data. The processed voice data may be converted into a transmittable form and output to a mobile communication base station through the mobile communication module 112. Various noise removal algorithms may be implemented in the microphone 122 to remove noise generated in receiving the external sound signal.

The user input unit 130 generates input data for the user to control the operation of the quality inspection system. The user input unit 130 may include a keypad, a dome switch, a touch pad (resistive/capacitive), a jog wheel, a jog switch, and the like.

In the present disclosure, the user may input a non-defective manufactured product image data set through the user input unit 130.

Of course, in addition to receiving images of the non-defective manufactured product from the user, it is also possible to automatically input information about non-defective manufactured product image results that are automatically machine-learned from other systems.

The sensing unit 140 generates a sensing signal for controlling the operation of the quality inspection system by detecting a current state of the quality inspection system, such as the open/closed state of the quality inspection system, the location of the quality inspection system, the presence or absence of user contact, the direction of the quality inspection system, and the acceleration/deceleration of the quality inspection system. Further, the sensing unit 140 may sense whether the power supply unit 190 supplies power, whether the interface unit 170 is combined with the external apparatus, and the like. Meanwhile, the sensing unit 140 may include a proximity sensor 141.

The output unit 150 which is used for generating an output related with sight, hearing, or touch may include a display unit 151, a sound output module 152, an alarm unit 153, a haptic module 154, a projector module 155, and the like.

The display unit 151 displays (outputs) information processed in the quality inspection system.

The display unit 151 may include at least one of a liquid crystal display (LCD), a thin film transistor-liquid crystal display (TFT LCD), an organic light-emitting diode (OLED), a flexible display, and a 3D display.

Some displays among them may be configured as a transparent or light transmissive type to view the outside through the displays. This may be called a transparent display and a representative example of the transparent display includes a transparent OLED (TOLED), and the like. A rear structure of the display unit 151 may also be configured as a light transmission structure. By such a structure, the user may see an object positioned behind a quality inspection system body through a region occupied by the display unit 151 of the quality inspection system body.

When the display unit 151 and a sensor (hereinafter, referred to as 'touch sensor') sensing a touch operation form a mutual layer structure (hereinafter, referred to as 'touch screen'), the display unit 151 may be used as an input apparatus as well as the output apparatus. The touch sensor may take the form of, for example, a touch film, a touch sheet, a touch pad, or the like.

The touch sensor may be configured to convert a change in pressure applied to a specific portion of the display unit 151 or capacitance generated at the specific portion of the display unit 151 into an electrical input signal. The touch sensor may be configured to detect touch pressure as well as a touched position and area.

When there is a touch input for the touch sensor, a signal(s) corresponding to the touch input is(are) sent to a touch controller. The touch controller processes the signal(s) and thereafter, transmits data corresponding thereto to the controller 180. As a result, the controller 180 may know which region of the display 151 is touched.

The proximity sensor 141 may be disposed within an internal region of the quality inspection system covered by the touch screen or in the vicinity of the touch screen. The proximity sensor refers to a sensor that detects the presence or absence of an object approaching a predetermined detection surface or an object which exists nearby without mechanical contact using electromagnetic field force or infrared rays. The proximity sensor has a longer lifetime and higher utilization than the touch sensor.

Examples of the proximity sensor include a transmission type photoelectric sensor, a direct reflection type photoelectric sensor, a mirror reflection type photoelectric sensor, a high frequency oscillation type proximity sensor, a capacitive proximity sensor, a magnetic proximity sensor, an infrared proximity sensor, and the like. When the touch screen is a capacitive sensor, the touch screen is configured to detect the proximity of the pointer by a change of an electric field depending on the proximity of the pointer. In this case, the touch screen (touch sensor) may be classified as the proximity sensor.

The sound output module 152 may output audio data received from the wireless communication unit 110 or stored in the memory 160 in a recording mode, a voice recognition mode, a broadcast receiving mode, and the like.

The sound output module 152 may output a sound signal related to a function performed by the quality inspection system. The sound output module 152 may include a receiver, a speaker, a buzzer, and the like.

The alarm unit 153 outputs a signal for notifying occurrence of an event of the quality inspection system. An example of the event which occurs in the quality inspection system includes message reception, key signal input, touch input, etc. The alarm unit 153 may also output another form other than a video signal or an audio signal, for example, a signal for notifying the occurrence of the event by vibration. The video signal or the audio signal may be output through the display unit 151 or the sound output module 152 so that the display unit 151 and the sound output module 152 may be classified as a part of the alarm unit 153.

The haptic module 154 generates various tactile effects that the user may feel. A typical example of the tactile effect generated by the haptic module 154 is vibration. The intensity and pattern of the vibration generated by the haptic module 154 are controllable.

In addition to the vibration, the haptic module 154 may generate various tactile effects including effects by stimulus including pin arrangement vertically moving with respect to a contact skin surface, spraying force or suction force of the air through an injection port or a suction port, a touch on the skin surface, contact with an electrode, electrostatic force, and the like and an effect of reproducing a cold and warm sensation using a heat absorbing or heatable element.

The haptic module 154 may be implemented not only to transmit the tactile effect through direct contact but also to allow the user to feel the tactile effect through the muscle sensation of the finger or arm. At least two haptic modules 154 may be provided according to a configuration aspect of the hand-held quality inspection system.

The projector module 155 as a component for performing an image project function by using the quality inspection system may display an image which is similar to or at least partially different from an image displayed on the display unit 151 according to a control signal of the controller 180 on an external screen or a wall.

Specifically, the projector module 155 may include a light source (not illustrated) that generates light (for example, laser light) for outputting an image to the outside, an image generating means (not illustrated) for generating an image to be output to the outside using the light generated by the light source, and a lens (not illustrated) for enlarging and outputting the image at a predetermined focal distance to the outside. In addition, the projector module 155 may include a device (not shown) capable of adjusting an image projection direction by mechanically moving the lens or the entire module.

The projector module 155 may be divided into a cathode ray tube (CRT) module, a liquid crystal display (LCD) module, a digital light processing (DLP) module, and the like according to the element type of the display means. In particular, the DLP module may be advantageous for miniaturization of the projector module 155 by enlarging and projecting an image generated by reflecting the light generated from the light source on a digital micromirror device (DMD) chip.

The memory 160 may store a program for processing and control of the controller 180 and may perform a function for temporarily storing input/output data (e.g., a message, an audio, a still image, a moving picture, or the like). The memory 160 may also store a usage frequency for each data jointly. Further, the memory 160 may store data regarding various patterns of vibrations and sounds output in the touch input on the touch screen.

The memory 160 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The interface unit 170 serves as a passage with all external devices connected to the quality inspection system. The interface unit 170 transmits data from the external device or receives power to deliver power to each component in the quality inspection system or transmits data in the quality inspection system to the external device. For example, a wireless/wired headset port, an external charger port, a wired/wireless data port, a memory card port, a port connecting a device with an identification module, an audio input/output (I/O) port, a video input/output (I/O) port, an earphone port, and the like may be included in the interface unit 170.

The identification module as a chip for storing various information for authenticating use rights of the quality inspection system may include a user identification module (UIM), a subscriber identity module (SIM), a universal subscriber identity module (USIM), and the like. Apparatuses (hereinafter referred to as "identification apparatus") with the identification module may be manufactured in a smart card format. Therefore, the identification apparatus may be connected with the quality inspection system via the port.

The interface unit may become a passage through which the power from a cradle is supplied to a mobile quality inspection system when the mobile quality inspection system is connected to an external cradle or may be a passage through which various command signals input from the cradle by the user are transmitted to the mobile quality inspection system. The various command signals or the power input from the cradle may serve as a signal for recognizing that the mobile quality inspection system is correctly mounted on the cradle.

The controller 180 generally controls all motions of the quality inspection system.

The controller 180 may include a preprocessor 200.

The preprocessor 200 does not apply a cropping task to cut and process only an area at a specific location within each image for each of the plurality of images included in the image data set, but may apply a resizing task of adjusting each image to a desired size and a padding task of adjusting the size of the image while maintaining a ratio of each image as it is.

A purpose of the operation of the preprocessor 200 is to preprocess the model to learn the images with the same size.

Meanwhile, the controller 180 may extract a non-defective manufactured product feature which becomes a non-defective manufactured product criterion from the preprocessed image.

Further, the controller 180 may generate a plurality of fake defective manufactured product features by adding a Gaussian noise feature to the extracted non-defective manufactured product feature.

Meanwhile, a separate discriminator (not illustrated) may be trained based on at least some of the non-defective manufactured product image data set received from the controller 180, the extracted non-defective manufactured product feature, and the plurality of fake defective manufactured product features.

Further, when the input unit receives an actual image, the preprocessor 200 may apply at least one of the resizing and padding tasks to the actual image to preprocess the actual image to extract features.

In addition, the controller 180 may extract actual features from the preprocessed actual image and the discriminator may determine whether an object in the actual image is the non-defective manufactured product or the defective manufactured product through the extracted actual feature, based on the learned contents.

The power supply unit 190 receives external power and internal power by a control of the controller 180 to supply power required for operations of respective components.

Various exemplary embodiments described herein may be implemented in a computer-readable recording medium or a recording medium readable by a device similar to the computer by using, for example, software, hardware, or a combination thereof.

According to hardware implementation, the exemplary embodiment described herein may be implemented by using at least one of the application specific integrated circuits (ASICs), the digital signal processors (DSPs), the digital signal processing devices (DSPDs), the programmable logic devices (PLDs), the field programmable gate arrays (FPGAs), the processors, the controllers, the micro-controllers, the microprocessors, and the electric units for performing other functions. In some cases, the exemplary embodiments described in the specification may be implemented by the controller 180 itself.

According to software implementation, exemplary embodiments such as a procedure and a function described in the specification may be implemented by separate software modules. Each of the software modules may perform one or more functions and operations described in the specification. A software code may be implemented by a software application written by an appropriate program language. The software code may be stored in the memory 160 and executed by the controller 180.

Deep Learning-based Quality Inspection Method

A quality inspection method proposed by the present disclosure will be described in detail based on the configuration of the deep learning-based quality inspection system applicable for the injection process described above.

The present disclosure relates to a deep learning/AI-based product surface quality inspection method which is accurate and reliable in product quality inspection which is a core task in an injection process among various manufacturing fields.

In the present disclosure, all pipelines of product quality inspection are developed considering characteristics of a factory environment and an actual product production process by using only a non-defective manufactured product image unlike most injection process surface inspection AIs developed to date. The present disclosure shows better performance than non-defective/defective manufactured product classification methodology which is an existing commonly used method.

The present disclosure includes quality analysis of images, learning of non-defective manufactured product images, and design of measurement methods for injection process products, and the deep learning-based injection process product quality inspection technology may minimize a problem such as poor detection of a defect in an actual injection process environment, and is expected to be extensively applied even to other manufacturing fields.

In the prior art, there was a problem in that the process environment was complex, and the collected images were not clear, so clear images were required for model learning, and image quality analysis and filtering must be done before the model learning.

Further, an image classification artificial intelligence (AI) required a large amount of non-defective manufactured products and defective data for learning, but since the defect rate was low in the actual process, it was difficult to collect a large amount of defective data, so there were significantly fewer cases of surface inspection AI application in manufacturing industry.

In contrast, the present disclosure has an advantage of being easily applied to a manufacturing site by inspecting the defect by using only the non-defective manufactured product image.

In addition, AI accuracy was unstable due to incorrect application of classification criteria at the manufacturing site, making field application difficult.

However, the present disclosure may modify model architecture and a loss function to stabilize field application of deep learning-based quality inspection technology.

According to the prior art, the size, length, color, etc. of each detected defect differed depending on the type, so there was a problem that it was difficult to set a single criterion for all facilities and train the network.

The present disclosure solves the problems and may be easily used by anyone with AI that does not require prior learning of the various types of defects that appear on the product surface, and is expected to be quickly applied to a rapidly changing manufacturing environment because labeling is not required.

Image data collected in the manufacturing industry is often not clear, but clear data is essential for subsequent training.

Image quality analysis is performed based on the inclusion of objects in the image, brightness, contrast, etc., and only clear images are selected by removing low-quality images.

Preprocessing is performed by using the latest technique to enhance defective samples in order to avoid failing to detect defects located at edges by considering characteristics of actual manufacturing images.

The present disclosure proposes a method for augmenting a fake defect feature by adding a Gaussian standard deviation to a non-defective sample as noise.

Further, in the present disclosure, model architecture and a loss function are modified to stabilize field application of deep learning-based quality inspection technology.

In the prior art, although the defects were the same, the characteristics of the defects appeared slightly differently, making it difficult to train an AI model.

The present disclosure may determine whether a product is non-defective or defective by learning only the non-defective manufactured product image without using various defective images.

Further, defect inspection is used as final judgment without adding AI technology or training to a defect measurement step due to difficulty in field application because a non-defective manufactured product criterion is different for each factory.

Further, since the deep learning-based quality inspection technology applicable for the injection process is artificial intelligence already learned by the non-defective manufactured product image, users need not separately construct learning data, and the deep learning-based quality inspection technology is expected to be quickly applied even in a manufacturing field such as small quantity production of multiple products.

The controller 180 according to the present disclosure may include a preprocessor 200.

The preprocessor 200 does not apply a cropping task to cut and process only an area at a specific location within each image for each of the plurality of images included in the image data set, but may apply a resizing task of adjusting each image to a desired size and a padding task of adjusting the size of the image while maintaining a ratio of each image as it is.

The purpose of the operation of the preprocessor 200 is to preprocess images with the same size so that the model may learn, and the controller 180 may extract a non-defective manufactured product feature which becomes a non-defective manufactured product criterion from the preprocessed image.

Figure 2:
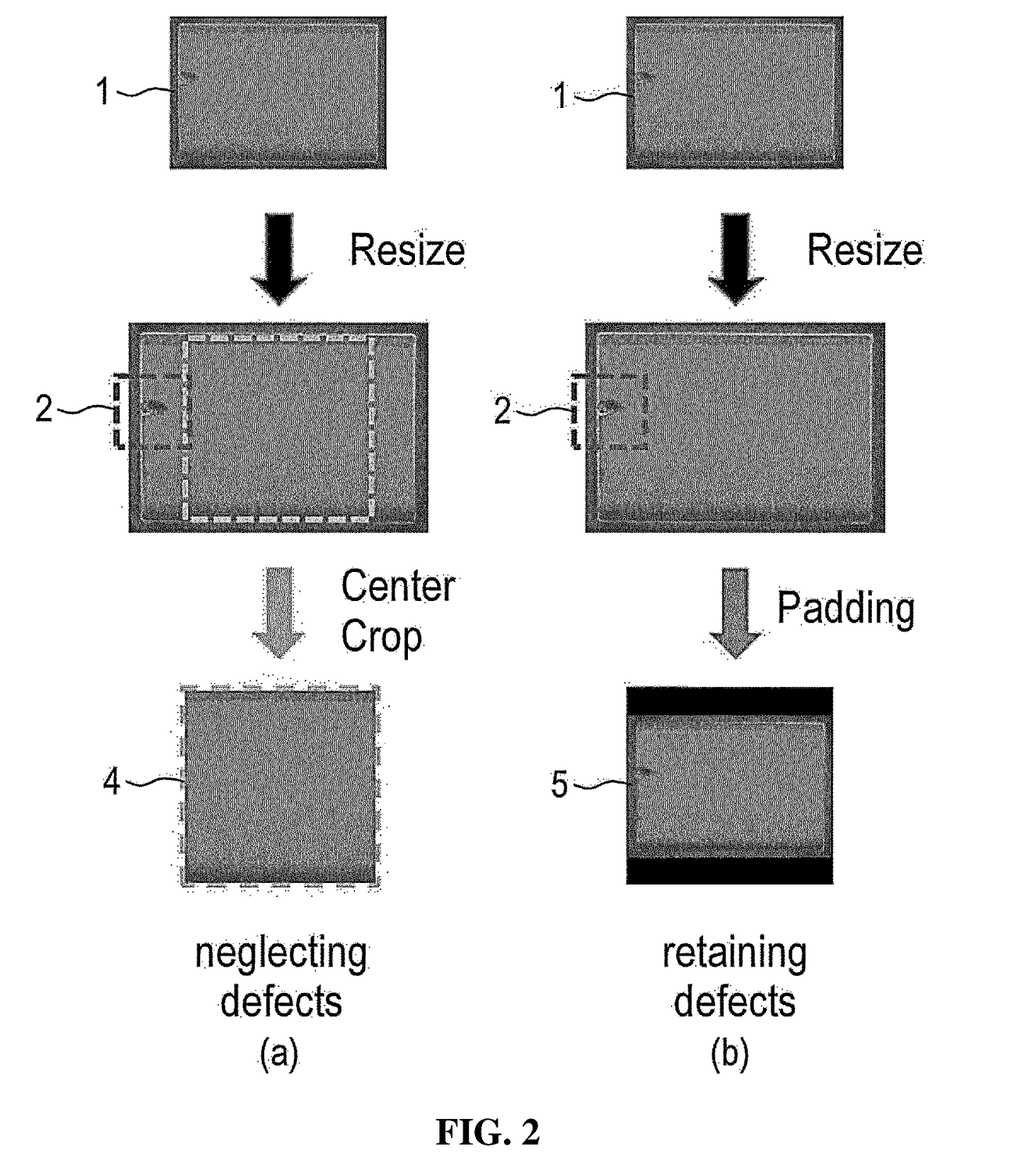
FIG. 2 is a diagram for describing an image preprocessing process according to the present disclosure.

FIG. 2 is a diagram for describing an image preprocessing process according to the present disclosure.

Referring to (a) of FIG. 2, an example is illustrated in which an object 1 is illustrated and the preprocessor 200 performs an operation of cropping only a center after resizing the object.

In this case, since an inspection image 4 is derived with an actual defective part 2 missing, information on the defect type is ignored and an error occurs in which a product is judged to be non-defective.

In contrast, referring to (b) of FIG. 2, the object 1 is illustrated, and the preprocessor 200 does not apply a cropping task to cut and process only an area at a specific location within each image for each of the plurality of images included in the image data set, but may apply a resizing task of adjusting each image to a desired size and a padding task of adjusting the size of the image while maintaining a ratio of each image as it is.

In this case, since the object 1 including the defect type 2 is preprocessed, the defective image remains included in inspection image 5, making accurate discrimination of a non-defective manufactured product possible.

Figure 3:
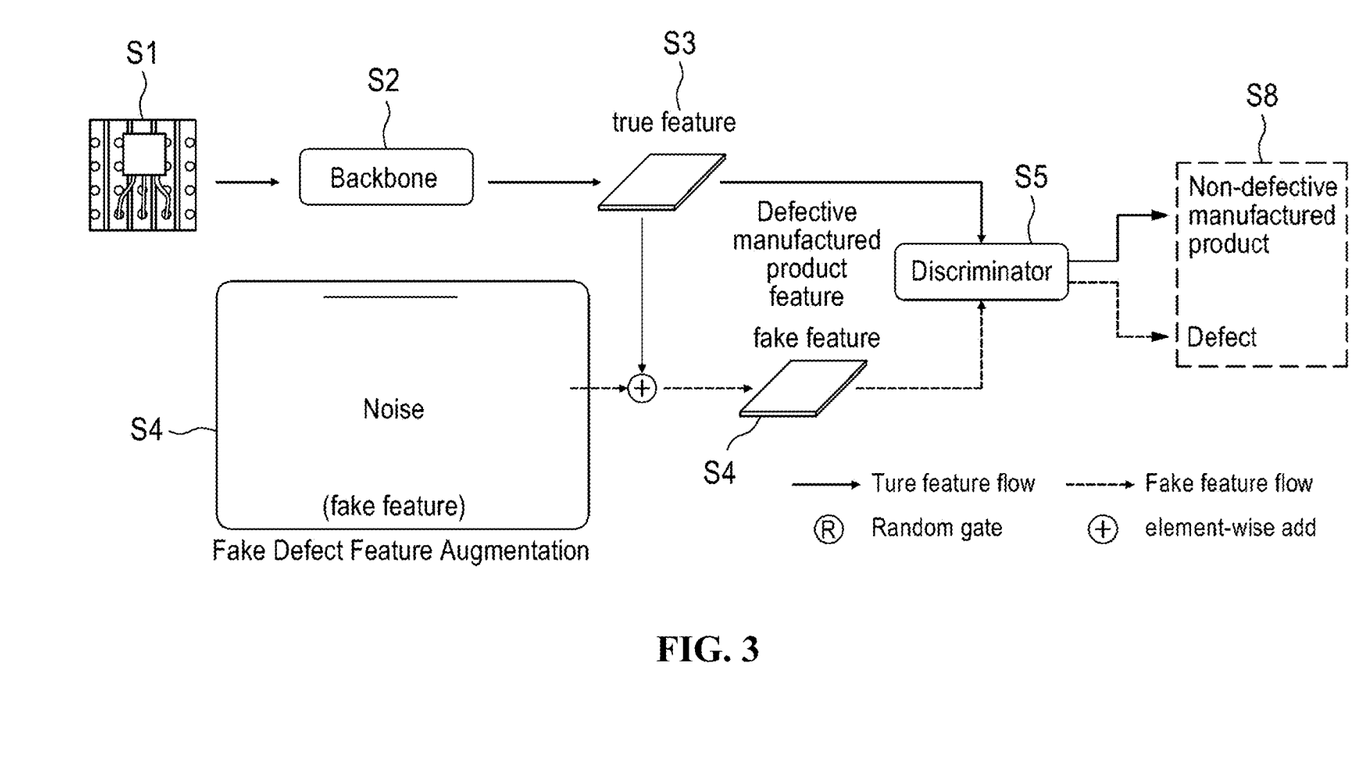
FIG. 3 illustrates an example of an injection process defective area detection AI model procedure according to the present disclosure.

Meanwhile, FIG. 3 illustrates an example of an injection process defective area detection AI model procedure according to the present disclosure.

Referring to FIG. 3, step S1 in which the input unit 120 receives a non-defective manufactured product image data set is illustrated.

Further, step S2 is illustrated in which the preprocessor 200 preprocesses the model to learn the images with the same size by not applying a cropping task to cut and process only an area at a specific location within each image for each of the plurality of images included in the image data set, but applying a resizing task of adjusting each image to a desired size and a padding task of adjusting the size of the image while maintaining a ratio of each image as it is.

Further, step S3 is illustrated in which the controller 180 extracts a non-defective manufactured product feature which becomes a non-defective manufactured product criterion from the preprocessed image.

Further, step S4 is illustrated in which the controller 180 generates a plurality of fake defective manufactured product features by adding a Gaussian noise feature to the extracted non-defective manufactured product feature.

Further, step S5 is illustrated in which the discriminator is trained based on at least some of the non-defective manufactured product image data set received from the controller 180, the extracted non-defective manufactured product feature, and the plurality of fake defective manufactured product features.

Thereafter, step S8 is illustrated in which the controller 180 extracts actual features from the preprocessed actual image and the discriminator determines whether an object in the actual image is the non-defective manufactured product or the defective manufactured product through the extracted actual feature, based on the learned contents.

Hereinafter, the method according to the present disclosure will be described in more detail with reference to FIG. 4.

Figure 4:
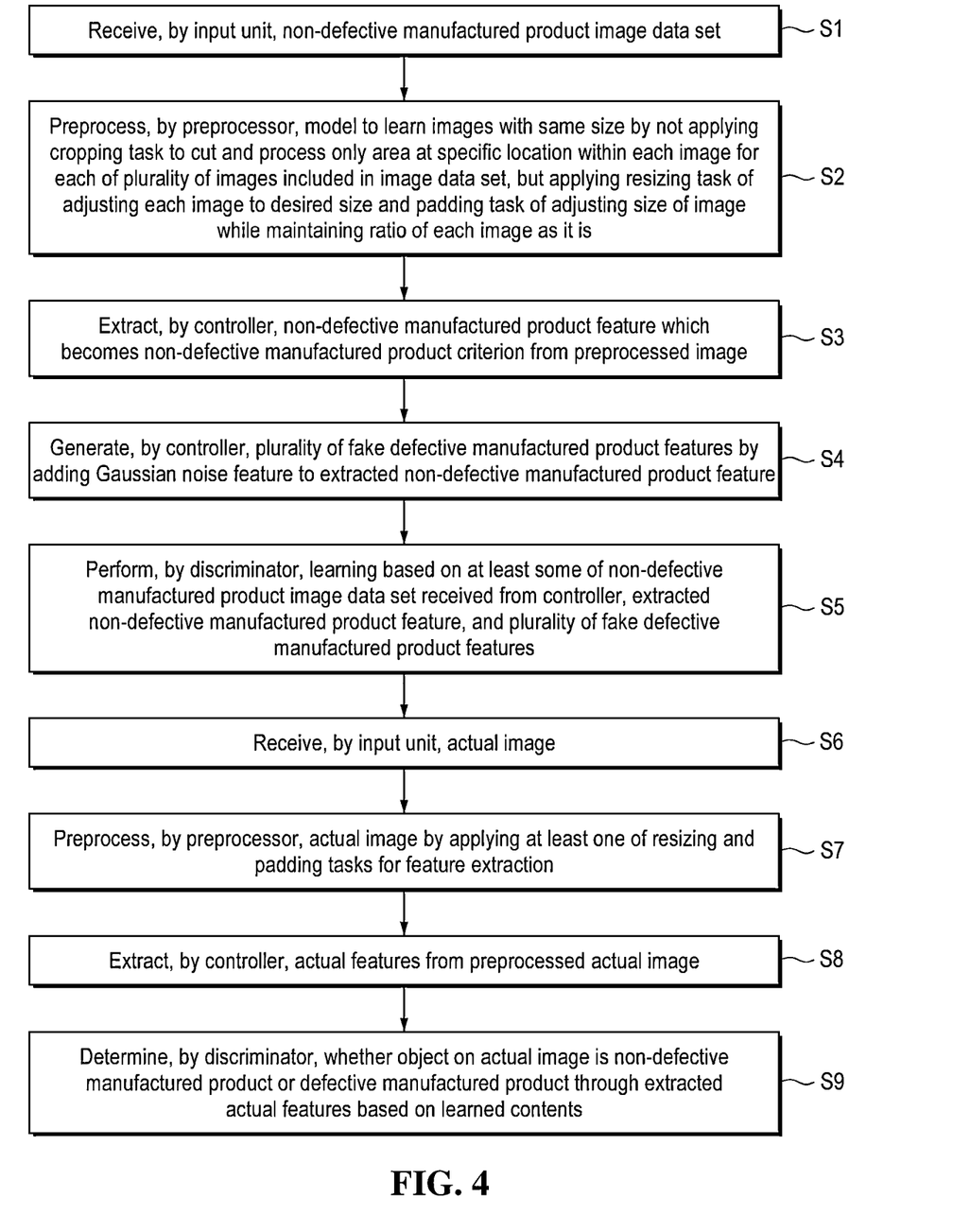
FIG. 4 illustrates an example of a flowchart of an injection process quality inspection pipeline according to the present disclosure.

FIG. 4 illustrates an example of a flowchart of an injection process quality inspection pipeline according to the present disclosure.

Referring to FIG. 4, first, step S1 in which the input unit 120 receives a non-defective manufactured product image data set is performed.

Thereafter, step S2 is performed in which the preprocessor 200 preprocesses the model to learn the images with the same size by not applying a cropping task to cut and process only an area at a specific location within each image for each of the plurality of images included in the image data set, but applying a resizing task of adjusting each image to a desired size and a padding task of adjusting the size of the image while maintaining a ratio of each image as it is.

Further, step S3 is performed in which the controller 180 extracts a non-defective manufactured product feature which becomes a non-defective manufactured product criterion from the preprocessed image.

In step S3 above, the controller 180 may input the preprocessed image into a backbone network capable of extracting features at a plurality of scales from a plurality of data, and extract the features of the non-defective manufactured product by combining results of outputs of a plurality of pre-designated steps.

Further, in step S3, the controller 180 may apply an average pooling operation to a second output result and a third output result of the backbone network and extract the non-defective manufactured product feature by combining the plurality of operated results.

Here, the backbone network represents a core structure of the deep learning model and is an important element used in various computer vision tasks such as image classification, object detection, and segmentation. The backbone network helps transform input data into a high-dimensional feature space, extract abstracted information, and perform a final task.

The backbone network is primarily used to process high-dimensional data such as image data, and is a deep neural network constituted by multiple layers to learn complex patterns and features. The neural network extracts high-level information while gradually transforming the input data into abstracted features.

Selection of the backbone network may vary depending on the given task. For example, in a computer vision task, various backbone network architectures are used, such as VGG, ResNet, Inception, MobileNet, etc., are used. The network architectures are designed according to the tasks such as image classification, object detection, segmentation, etc., and have capabilities of extracting different features.

In summary, the backbone network is the core structure of the deep learning model and is usefully used in various computer vision tasks by transforming the input data into the abstracted features.

Thereafter, step S4 is performed in which the controller 180 generates a plurality of fake defective manufactured product features by adding a Gaussian noise feature to the extracted non-defective manufactured product feature.

In step S4 above, the controller 180 may augment the plurality of fake defective manufactured product features by randomly selecting the Gaussian noise feature from the standard deviation, and adding the selected Gaussian noise feature to the extracted non-defective manufactured product features.

Further, step S5 is performed in which the discriminator (not illustrated) performs learning based on at least some of the non-defective manufactured product image data set received from the controller, the extracted non-defective manufactured product feature, and the plurality of fake defective manufactured product features.

In step S5, the discriminator may be trained using hardness-aware soft cross entropy which is a loss function that adjusts a weight so that the model may concentratively learn samples of a small number which is equal to or less than a predetermined number.

The "Hardness-aware Soft Cross Entropy" as one of the loss functions of the deep learning model is a method used primarily when performing the classification task in data sets having unbalanced class distribution. This method is designed to improve overall performance by inducing the model to focus more on more difficult samples.

A general cross entropy loss function is to minimize predicted errors by treating all cases with equal weight. However, if the imbalance between classes is severe, classes with a large number of samples may be considered relatively less important. This may result in poor performance for minority classes.

The "Hardness-aware Soft Cross Entropy" is contrived to solve such a problem. This method calculates the loss by applying soft weights considering the 'difficulty' of the sample. In other words, the model is trying to improve the performance of that class by giving greater weight to uncertain or difficult samples. By doing this, the model may obtain a more balanced result even with an unbalanced class distribution.

This approach helps improve the model's ability and is one of the important techniques that may improve classification performance in imbalanced data sets.

The "Hardness-aware Soft Cross Entropy" according to the present disclosure as one of the loss functions of the deep learning model is a method used primarily when performing the classification task in data sets having unbalanced class distribution. This method may be designed and used to improve overall performance by inducing the model to focus more on more difficult samples.

Further, the plurality of fake defective manufactured product features may include short shot, flash, sink mark, silver streak, cloudy surface, weldline, void, crazing/cracking, and delamination.

FIG. 5 illustrates an example of a defect type according to the present disclosure.

Referring to FIG. 5, detailed examples of (a) the short shot, (b) the flash, (c) the sink mark, (d) the silver streak, (e) the cloudy surface, (f) the weldline, (g) the void, (h) the crazing/cracking, and (i) the delamination are illustrated.

Various types of defects appear on the surface of the product, and features thereof are enabled to be distinguished into 9 types as in FIG. 5.

Most defect types are distinguished into short shot, flash, sink mark, silver streak, cloudy surface, weldline, void, crazing/cracking, and delamination as illustrated in FIG. 5, and the features of the defect types are distinctly different from each other in terms of a background and a color, a shape, and an appearance.

Meanwhile, after the contents are set, a step is performed in which the input unit 120 receives an actual image (S6), and the preprocessor 200 preprocesses the actual image by applying at least one of the resizing and padding tasks to the actual image to extract features (S7).

Further, when the controller 180 extracts actual features from the preprocessed actual image (S8), a step is performed in which the discriminator determines whether an object in the actual image is the non-defective manufactured product or the defective manufactured product through the extracted actual feature, based on the learned contents (S9).

That is, in the present disclosure, in the image preprocessing process, resizing and padding of the input image are performed so that the model may learn images with the same size.

In addition, in feature extraction of non-defective manufactured product images, non-defective manufactured product data may be inserted into the backbone network to extract features in the second and third layers.

In addition, the feature of the non-defective manufactured product image may be obtained by combining the results of the average pooling operation of the outputs of the second and third steps of the backbone network.

Further, in fake defect feature augmentation, a fake defect feature may be generated by adding Gaussian noise to the feature of the non-defective manufactured product image.

In addition, virtual defective feature data may be augmented by randomly selecting the Gaussian noise in the standard deviation for each sample.

Further, in discriminator training, actual images and fake defective images are transferred to the discriminator.

At this time, the discriminator may be trained using hardness-aware soft cross entropy as the loss function.

In an actual process, it is difficult to collect a large amount of defective data because the defect rate is low, and the features of each defect type appear slightly differently, making it difficult to train an AI model, and in the present disclosure, it is possible to discriminate whether a product is the non-defective manufactured product or the defective manufactured product by learning only from non-defective manufactured product images which are enabled to be easily collected.

In addition, by modifying the model architecture of preprocessing, learning strategy, and loss function to stabilize field application of deep learning-based quality inspection technology, workers may create a network with optimal and consistent performance even if learning is stopped at any time.

The present disclosure is a model which need not learn various types of defects which appear on a product surface by artificial intelligence learned only by the non-defective manufactured product image, and users do not need to construct separate learning data, and the present disclosure is expected to be quickly applied the model in various manufacturing sites such as small quantity production of multiple products.

Effects According to Present Disclosure

In order to solve the problems in the prior art, it is possible to provide a deep learning system applicable for quality inspection by learning only non-defective manufactured product data which is accurate and reliable in product quality inspection which is a core task in an injection process among various manufacturing fields, and a control method thereof.

It is possible to provide a system of inspecting a defect by using only a non-defective manufactured product image which can be easily collected, which is developed by the present disclosure, and a control method thereof because it is difficult to collect a large amount of defective data due to a low defective rate.

Further, it is possible to provide a system of performing preprocessing by using a latest technique to enhance defective samples and a control method thereof, in order to avoid failing to detect defects located at edges by considering characteristics of actual manufacturing images.

Further, in the present disclosure, it is possible to provide a method for enhancing a fake defect feature by adding a Gaussian standard deviation to a non-defective sample as noise, and a system applying and modifying model architecture and a loss function to stabilize field application of deep learning-based quality inspection technology, and a control method thereof.

The present disclosure may provide, to a user, better performance than non-defective/defective manufactured product classification methodology which is an existing commonly used method through a method and a system considering characteristics of a factory environment and an actual product production process for all pipelines of product quality inspection by using only a non-defective manufactured product image unlike most injection process surface inspection AIs developed to date.

Further, the present disclosure includes quality analysis of images, learning of non-defective manufactured product images, design of measurement methods for injection process products, and the like, and the deep learning-based injection process product quality inspection technology may minimize a problem such as poor detection of a defect in an actual injection process environment, and can be extensively applied even to other manufacturing fields.

Further, the present disclosure may modify model architecture and a loss function to stabilize field application of deep learning-based quality inspection technology.

Further, the present disclosure may use defect inspection as final judgment without adding AI technology or training to a defect measurement step due to difficulty in field application because a non-defective manufactured product criterion is different for each factory.

Further, since the deep learning-based quality inspection technology applicable for the injection process proposed by the present disclosure is artificial intelligence already learned by the non-defective manufactured product image, users need not separately construct learning data, and the deep learning-based quality inspection technology may be quickly applied even in a manufacturing field such as small quantity production of multiple products.

In this specification, differences between academic research and applications in the manufacturing industry are identified and an accurate and reliable anomaly detection and detection system is introduced to respond to the differences.

Compared to previous research, the product according to the present disclosure is designed to intensively solve the difficulties of quality inspection in actual industry, users do not need to construct separate learning data, and the product according to the present disclosure is expected to be quickly applied in various manufacturing sites such as small quantity production of multiple products.

In addition, the system according to the present disclosure is expected to increase the efficiency of the manufacturing process by detecting defects more effectively in the actual manufacturing industry.

Meanwhile, effects which can be obtained in the present disclosure are not limited to the aforementioned effects and other unmentioned effects will be clearly understood by those skilled in the art from the following description.

The exemplary embodiments of the present disclosure described above may be implemented through various means. For example, the exemplary embodiments of the present disclosure may be implemented by hardware, firmware, software, or combinations thereof.

In the case of implementation by hardware, the method according to the exemplary embodiment of the present disclosure may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the method according to the embodiments of the present disclosure may be implemented in the form of a module, a procedure, or a function to perform the functions or operations described above. A software code may be stored in the memory unit and executed by the processor. The memory unit may be positioned inside or outside the processor and may transmit and receive data to/from the processor by already known various means.

Detailed description of the preferred exemplary embodiments of the present disclosure disclosed as described above are provided so as for those skilled in the art to implement and execute the present disclosure.

The present disclosure has been described with reference to the preferred exemplary embodiments, but those skilled in the art will understand that the present disclosure can be variously modified and changed without departing from the scope of the present disclosure.

For example, those skilled in the art may use the respective components disclosed in the exemplary embodiments by combining the respective components with each other.

Therefore, the present disclosure is not limited to the embodiments described herein but intends to grant the widest range which is coherent with the principles and new features disclosed herein.

The present disclosure may be embodied in other specific forms without departing from the spirit and essential characteristics of the present disclosure.

Accordingly, the aforementioned detailed description should not be construed as restrictive in all terms and should be exemplarily considered.

The scope of the present disclosure should be determined by rational construing of the appended claims and all modifications within an equivalent scope of the present disclosure are included in the scope of the present disclosure.

The present disclosure is not limited to the embodiments described herein but intends to grant the widest range which is coherent with the principles and new features presented herein.

Further, the claims that are not expressly cited in the claims are combined to form an exemplary embodiment or be included in a new claim by an amendment after the application.

What is claimed is:

1. A deep learning-based quality inspection method by learning only non-defective manufactured product data, comprising:
   step 1 of receiving, by an input unit, a non-defective manufactured product image data set;
   step 2 of preprocessing, by a preprocessor, a model to learn images with a same size by not applying a cropping task to cut and process only an area at a specific location within the each image for each of the plurality of images included in the image data set, but applying a resizing task of adjusting the each image to a desired size and a padding task of adjusting the size of the image while maintaining a ratio of the each image as it is;

step 3 of extracting, by a controller, a non-defective manufactured product feature which becomes a non-defective manufactured product criterion from the preprocessed image;

step 4 of generating, by the controller, a plurality of fake defective manufactured product features by adding a Gaussian noise feature to the extracted non-defective manufactured product feature;

step 5 of performing, by a discriminator, learning based on at least some of the non-defective manufactured product image data set received from the controller, the extracted non-defective manufactured product feature, and the plurality of fake defective manufactured product features;

step 6 of receiving, by the input unit, an actual image;

step 7 of preprocessing, by the preprocessor, the actual image by applying at least one of the resizing and padding tasks for feature extraction;

step 8 of extracting, by the controller, actual features from the preprocessed actual image; and step 9 of determining, by the discriminator, whether an object on the actual image is a non-defective manufactured product or a defective manufactured product through the extracted actual features based on the contents learned in step 5, wherein in step S3 above, the controller inputs the preprocessed image into a backbone network capable of extracting features at a plurality of scales from a plurality of data, and extracts the features of the non-defective manufactured product by combining results of outputs of a plurality of pre-designated steps, in step S3 above, the controller applies an average pooling operation of calculating an average value of a plurality of points, and replacing the calculated average value with one representative value to each of a second output result and a third output result of the backbone network, and extracts the non-defective manufactured product feature by combining the second output result and the third output result to which the average pooling operation is applied, in step 4 above, the controller adds the Gaussian noise feature generated by using a randomly selected standard deviation to the extracted non-defective manufactured product feature to augment the plurality of fake defective manufactured product features, and in step S5 above, the discriminator is trained using hardness-aware soft cross entropy which is a loss function that adjusts a weight so that the model may concentratively learn samples of a small number which is equal to or less than a predetermined number.

2. The deep learning-based quality inspection method by learning only non-defective manufactured product data of claim 1, wherein the plurality of fake defective manufactured product features includes short shot, flash, sink mark, silver streak, cloudy surface, weldline, void, crazing/cracking, and delamination.

3. A deep learning-based quality inspection system by learning only non-defective manufactured product data, comprising:

an input unit receiving a non-defective manufactured product image data set;

a preprocessor preprocessing a model to learn images with a same size by not applying a cropping task to cut and process only an area at a specific location within the each image for each of the plurality of images included in the image data set, but applying a resizing task of adjusting the each image to a desired size and a padding task of adjusting the size of the image while maintaining a ratio of the each image as it is;

a controller extracting a non-defective manufactured product feature which becomes a non-defective manufactured product criterion from the preprocessed image, and generating a plurality of fake defective manufactured product features by adding a Gaussian noise feature to the extracted non-defective manufactured product feature; and a discriminator performing learning based on at least some of the non-defective manufactured product image data set received from the controller, the extracted non-defective manufactured product feature, and the plurality of fake defective manufactured product features, wherein the preprocessor preprocesses an actual image by applying at least one of the resizing and padding tasks for feature extraction when receiving the actual image by the input unit, the controller extracts actual features from the preprocessed actual image; and the discriminator judges whether an object on the actual image is a non-defective manufactured product or a defective manufactured product through the extracted actual features based on the learned contents, the controller inputs the preprocessed image into a backbone network capable of extracting features at a plurality of scales on a plurality of data, applies an average pooling operation of calculating an average value of a plurality of points, and replacing the calculated average value with one representative value to each of a second output result and a third output result of the backbone network, and extracts the non-defective manufactured product feature by combining the second output result and the third output result to which the average pooling operation is applied, the controller adds the Gaussian noise feature generated by using a randomly selected standard deviation to the extracted non-defective manufactured product feature to augment the plurality of fake defective manufactured product features, and the discriminator is trained using hardness-aware soft cross entropy which is a loss function that adjusts a weight so that the model may concentratively learn samples of a small number which is equal to or less than a predetermined number.

4. The deep learning-based quality inspection system by learning only non-defective manufactured product data of claim 3, wherein the plurality of fake defective manufactured product features includes short shot, flash, sink mark, silver streak, cloudy surface, weldline, void, crazing/cracking, and delamination.

* * * * *